United States Patent
Yanazawa et al.

(10) Patent No.: US 10,322,685 B2
(45) Date of Patent: Jun. 18, 2019

(54) WIRE HARNESS

(71) Applicants: YAZAKI CORPORATION, Tokyo (JP); TOYOTA JIDOSHA KABUSHIKI KAISHA, Toyota-shi, Aichi-ken (JP)

(72) Inventors: Kenta Yanazawa, Makinohara (JP); Hideomi Adachi, Makinohara (JP); Yoshiyuki Ishihara, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/259,558

(22) Filed: Sep. 8, 2016

(65) Prior Publication Data

US 2017/0066392 A1 Mar. 9, 2017

(30) Foreign Application Priority Data

Sep. 9, 2015 (JP) .................. 2015-177229

(51) Int. Cl.
*B60R 16/02* (2006.01)
*H02G 3/04* (2006.01)

(52) U.S. Cl.
CPC ....... *B60R 16/0215* (2013.01); *H02G 3/0481* (2013.01)

(58) Field of Classification Search
CPC ...... H02G 3/04; H02G 3/0462; H02G 3/0468; H02G 15/007; B60R 16/0215; H01B 11/1834; H01B 7/0869; H01B 7/16; H01B 7/17; H01B 7/18; H01B 7/1805; H01B 7/1815; H01B 7/182; H01B 11/1843; H01B 11/1852

USPC ...... 174/42, 99 R, 110 F, 116, 119 R, 121 R, 174/146, 29, 138 E, 113 R, 117 AS
See application file for complete search history.

(56) References Cited

U.S. PATENT DOCUMENTS

| | | | | | |
|---|---|---|---|---|---|
| 1,384,173 | A | * | 7/1921 | Wikander | F16C 17/024 174/42 |
| 1,686,782 | A | * | 10/1928 | Wodtke | H01B 7/428 174/110 R |
| 2,186,793 | A | * | 1/1940 | Wodtke | H01B 7/1895 156/55 |
| 2,556,244 | A | * | 6/1951 | Weston | H01B 11/1834 174/29 |

(Continued)

FOREIGN PATENT DOCUMENTS

| | | |
|---|---|---|
| JP | 2006231939 A | 9/2006 |
| JP | 2011-254614 A | 12/2011 |
| JP | 201491383 A | 5/2014 |

OTHER PUBLICATIONS

Office Action dated Sep. 5, 2017, by the Japanese Patent Office in counterpart Japanese Application No. 2015-177229.

*Primary Examiner* — Roshn K Varghese
(74) *Attorney, Agent, or Firm* — Sughrue Mion, PLLC

(57) ABSTRACT

A wire harness includes an outer member having a tubular shape, at least one conductive path configured to be contained in the outer member and protected by the outer member, and a linear vibration suppressing member configured to suppress shaking of the at least one conductive path by decreasing a play ratio of the at least one conductive path in an inside of at least a prescribed portion of the outer member.

9 Claims, 3 Drawing Sheets

(56) References Cited

U.S. PATENT DOCUMENTS

| | | | | |
|---|---|---|---|---|
| 2,732,422 A | * | 1/1956 | Rapp | H01B 7/1895 |
| | | | | 174/116 |
| 3,055,967 A | * | 9/1962 | Bondon | H01B 11/1843 |
| | | | | 174/28 |
| 3,227,800 A | * | 1/1966 | Bondon | H01B 11/1847 |
| | | | | 174/29 |
| 3,288,916 A | * | 11/1966 | Koon | H01B 7/1895 |
| | | | | 174/116 |
| 3,749,813 A | * | 7/1973 | Shealy | H02G 7/14 |
| | | | | 174/127 |
| 3,829,603 A | * | 8/1974 | Hansen | H01B 9/028 |
| | | | | 174/115 |
| 3,857,996 A | * | 12/1974 | Hansen | H01B 7/187 |
| | | | | 174/113 R |
| 4,533,789 A | * | 8/1985 | Katz | H01B 7/18 |
| | | | | 174/102 R |
| 4,767,890 A | * | 8/1988 | Magnan | H01B 11/12 |
| | | | | 174/102 R |
| 5,313,020 A | * | 5/1994 | Sackett | H01B 11/002 |
| | | | | 174/113 C |
| 5,829,485 A | * | 11/1998 | Fatato | H02G 3/0468 |
| | | | | 138/110 |
| 2011/0297415 A1 | | 12/2011 | Katou et al. | |

* cited by examiner

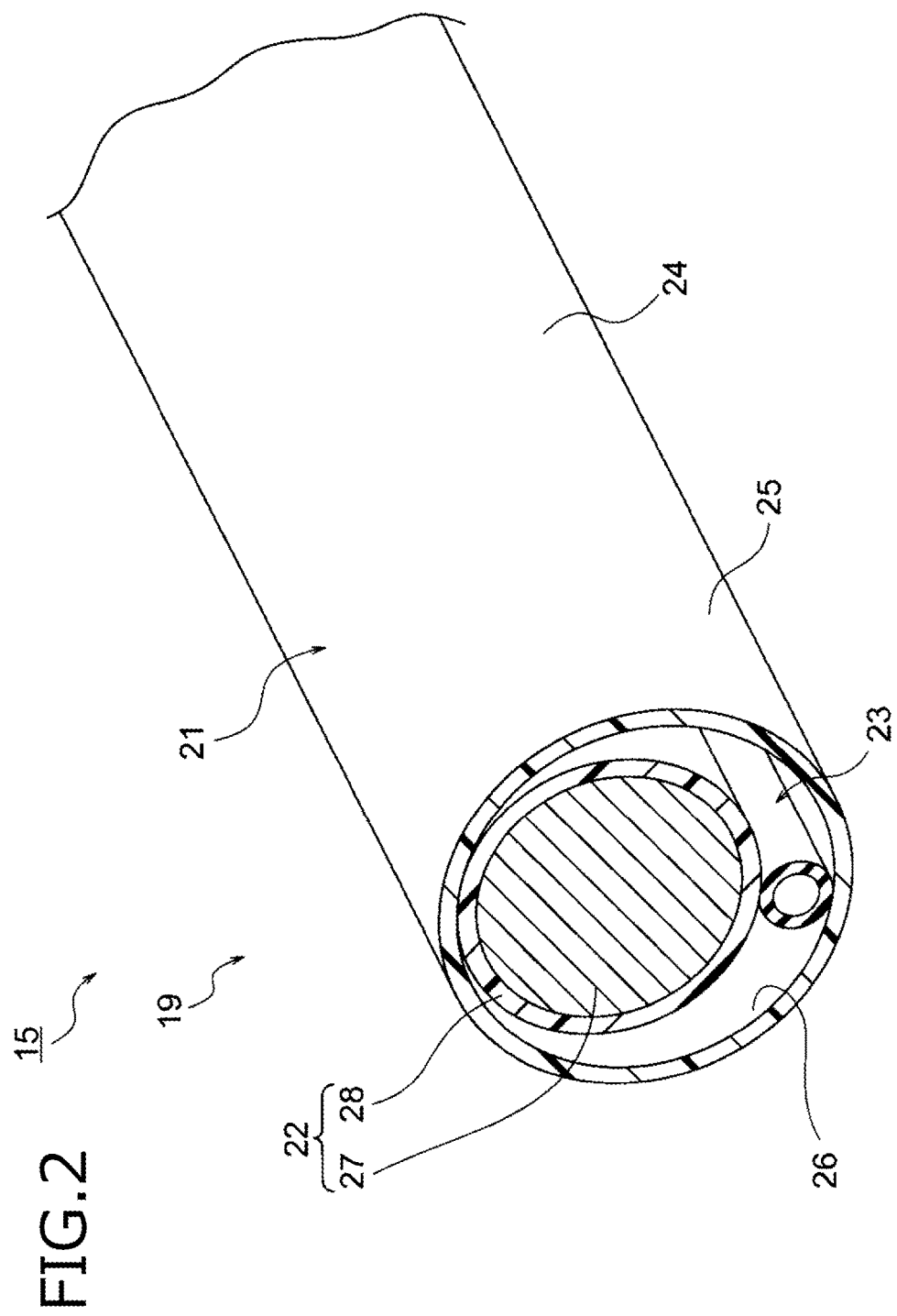

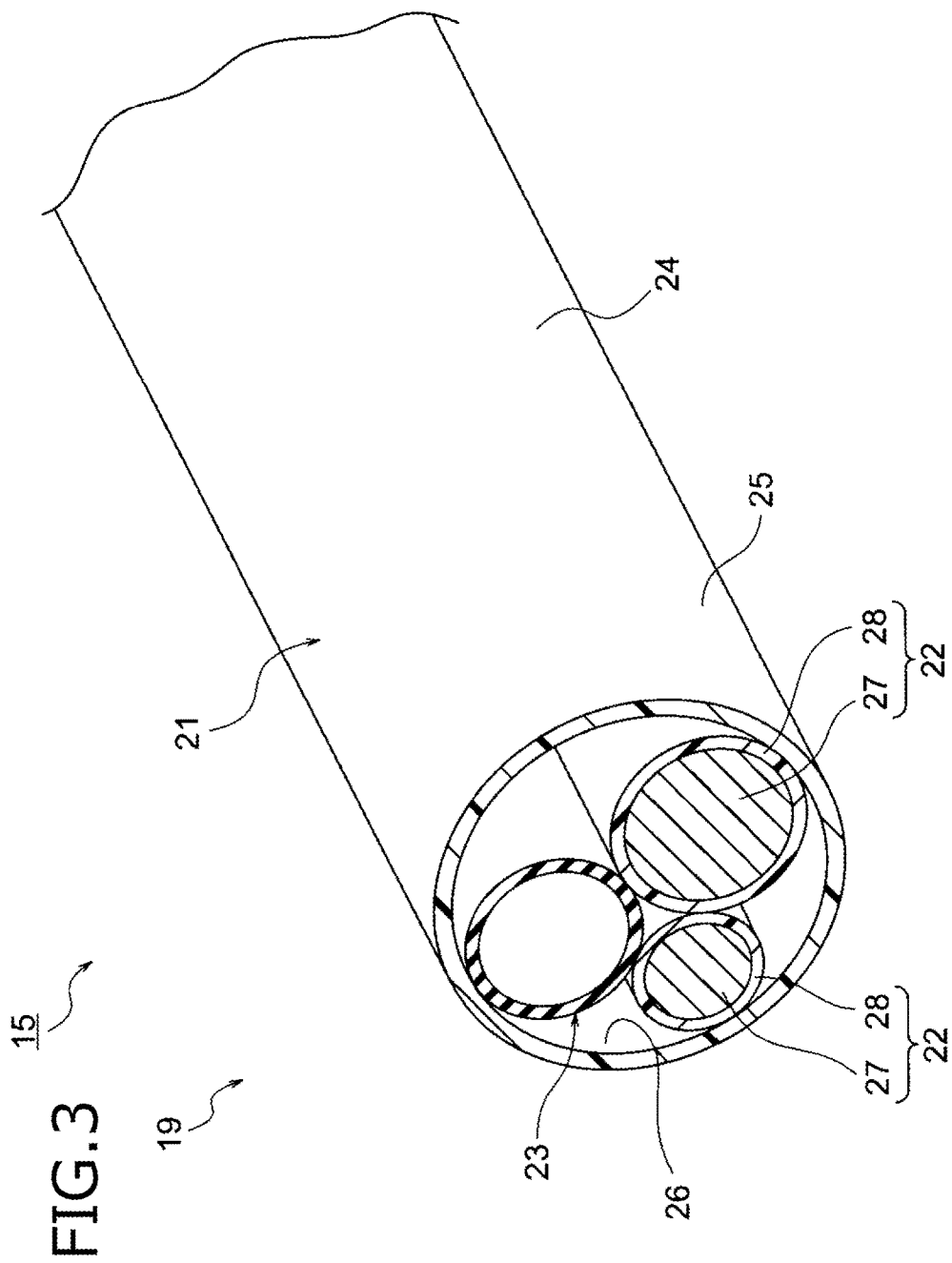

WIRE HARNESS

CROSS REFERENCE TO RELATED APPLICATIONS

This application is based on Japanese Patent Application (No. 2015-177229) filed on Sep. 9, 2015, the contents of which are incorporated herein by reference.

BACKGROUND OF THE INVENTION

1. Field of the Invention

The present invention relates to a wire harness including a tubular outer member and one or plural conductive paths contained in the outer member and protected by the outer member.

2. Description of the Related Art

Wire harnesses are used for electrically connecting apparatus installed in an automobile. Wire harnesses are equipped with a tubular outer member and one or plural conductive paths housed in the outer member. For example, JP-A-2011-254614 discloses a wire harness which is long and is routed so that part of it runs under the floor of an automobile. The portion, running under the floor of the automobile, of the wire harness goes straightly. In the wire harness disclosed in JP-A-2011-254614, a phenomenon occurs that in its straightly routed portion the conductive path(s) housed in the outer member shakes due to vibration etc. that occur while the automobile is running.

In the above related wire harness, when the conductive path(s) housed in the outer member shakes widely due to vibration that occurs while the automobile is running, a covering (an outside braid or metal foil of the conductive path(s) in the case where it has a shield function) of the conductive path(s) may hit the inner surface of the outer member strongly and thereby be damaged.

SUMMARY OF THE INVENTION

The present invention has been made in view of the above circumstances, and an object of the invention is therefore to provide a wire harness capable of suppressing shaking of a conductive path(s) inside an outer member.

To solve the above problem, the invention provides a wire harness including: an outer member having a tubular shape; at least one conductive path configured to be contained in the outer member and protected by the outer member; and a linear vibration suppressing member configured to suppress shaking of the at least one conductive path by decreasing a play ratio of the at least one conductive path in an inside of at least a prescribed portion of the outer member.

According to the above configuration, since the linear vibration suppressing member is provided inside of the outer member additionally, the play ratio of the conductive path(s) in the inside of the prescribed portion of the outer member can be decreased. Also, the width of shaking of the conductive path(s) can be reduced in the prescribed portion. Thus, the shaking of the conductive path(s) relative to the outer member can be suppressed even in a portion where it would otherwise be prone to shake.

Since the linear vibration suppressing member is provided additionally, shaking of the conductive path(s) in the outer member can be suppressed even during running of the vehicle in which the wire harness is installed. This prevents an event that the covering (an outside braid or metal foil of the conductive path(s) in the case where it has a shield function) of the conductive path(s) is damaged.

For example, the linear vibration suppressing member is an elastic tube which is contained in the external member together with the at least one conductive path.

According to the above configuration, since the elastic tube is inserted as the linear vibration suppressing member in the external member together with the conductive path(s), shaking of the conductive path(s) relative to the outer member can be suppressed by the elasticity of the tube.

For example, the prescribed portion of the outer member corresponds to a portion where the wire harness is routed straightly.

According to the above configuration, the conductive path(s) is prone to shake in the prescribed portion corresponding to the portion, wired straightly, of the wire harness and the linear vibration suppressing member is provided in this straight routing portion of the wire harness. Thus, shaking of the conductive path(s) relative to the outer member can be suppressed even in the portion where it would otherwise be prone to shake.

BRIEF DESCRIPTION OF THE DRAWINGS

FIG. 1A shows how a high-voltage wire harness is routed and FIG. 1B shows how another wire harness, that is, a low-voltage wire harness, is routed.

FIG. 2 is a perspective view showing the configuration of a wire harness according to the embodiment which has one conductive path.

FIG. 3 is a perspective view showing the configuration of another wire harness according to the embodiment which has two conductive paths.

DETAILED DESCRIPTION OF THE EXEMPLARY EMBODIMENTS

The present invention provides a wire harness which includes a tubular outer member, one or plural conductive paths inserted and contained in and protected by the outer member, and a linear vibration suppressing member which is inserted and contained in the outer member together with the conductive path(s). The linear vibration suppressing member is a linear member for suppressing shaking of the conductive path(s) by decreasing its play ratio in the inside of at least a prescribed portion of the outer member. For example, the linear vibration suppressing member is provided by an elastic tube. By incorporating the linear vibration suppressing member inside the outer member, shaking of the conductive path(s) relative to the outer member can be suppressed.

Embodiment

An embodiment of the invention will be hereinafter described with reference to the drawings. The embodiment is such that the invention is applied to a wire harness that is routed in a hybrid vehicle. (The invention may also be applied to an electric vehicle, an ordinary automobile that runs using an engine, and the like).

<Configuration of Hybrid Vehicle 1>

Figure 1A:
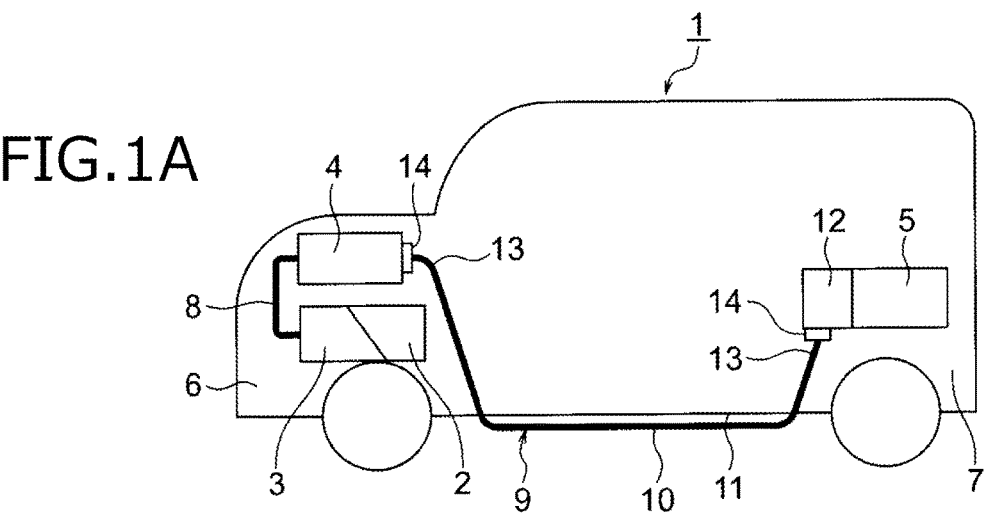
FIGS. 1A and 1B show wire harnesses according to an embodiment of the present invention.

As shown in FIG. 1A, a hybrid vehicle 1 is driven by mixing two kinds of motive power of an engine 2 and a motor unit 3. Electric power is supplied from a battery (battery pack) 5 to the motor unit 3 via an inverter unit 4. In the embodiment, the engine 2, the motor unit 3, and the inverter unit 4 are mounted in an engine room 6 which is located adjacent to the front wheels etc. The battery 5 is mounted in a vehicle rear part 7 where the rear wheels etc. are disposed (or may be mounted in a vehicle compartment which is located in the rear of the engine room 6).

The motor unit 3 and the inverter unit 4 are connected to each other by a high-voltage wire harness (high-voltage motor cable) 8. Likewise, the battery 5 and the inverter unit 4 are connected to each other by a high-voltage wire harness 9. An intermediate portion 10 of the wire harness 9 is routed under a vehicle floor 11 of the vehicle (vehicle body) approximately parallel with it. The vehicle floor 11, which is a known vehicle body part and is what is called a panel member, is formed with through-holes at prescribed positions. The wire harness 9 is inserted through the through-holes water-tightly.

The wire harness 9 and the battery 5 are connected to each other via a junction block 12 which is attached to the battery 5. An external connection means such as a shield connector 14 provided for a rear-end harness terminal 13 of the wire harness 9 is electrically connected to the junction block 12. The wire harness 9 is electrically connected to the inverter unit 4 via an external connection means such as another shield connector 14 provided for a front-end harness terminal 13 of the wire harness 9.

The motor unit 3 includes a motor and a generator, and the inverter unit 4 includes an inverter and a converter. The motor unit 3 is implemented as a motor assembly including a shield case. Likewise, the inverter unit 4 is implemented as an inverter assembly including a shield case. The battery 5 is of a Ni-MH type or a Li ion type and is implemented as a module. Alternatively, an electric storage device such as a capacitor can be used as the battery 5. It goes without saying that there are no particular limitations on the battery 5 as long as it can be used for the hybrid vehicle 1 (or an electric vehicle).

Figure 1B:
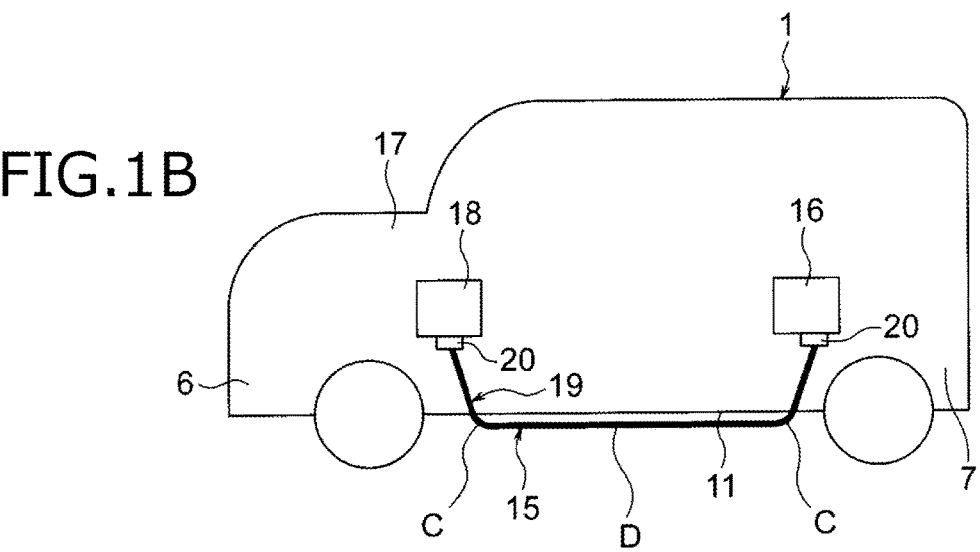

As shown in FIG. 1B, a wire harness 15, which is a low-voltage wire harness, is provided to electrically connect a low-voltage battery 16 disposed in the vehicle rear part 7 of the hybrid vehicle 1 to an auxiliary device (device) 18 mounted in a vehicle font part 17. Like the wire harness 9 shown in FIG. 1A, part of the wire harness 15 is routed under the vehicle floor 11 (this is just an example; it may be routed on the compartment side).

As shown in FIGS. 1A and 1B, the high-voltage wire harnesses 8 and 9 and the low-voltage wire harness 15 are routed in the hybrid vehicle 1. Although the invention is applicable to any of them, the following description will be made of a representative one, that is, the low-voltage wire harness 15.

<Configuration of Wire Harness 15>

As shown in FIG. 1B, the long wire harness 15, part of which is routed under the vehicle floor 11, includes a harness main body 19 and connectors 20 provided for the two respective terminals of the harness main body 19. The wire harness 15 also includes fixing members (e.g., clamps; not shown) for wiring itself along a prescribed route and water stop members (e.g., grommets; not shown).

<Configuration of Harness Main Body 19>

As shown in FIGS. 2 and 3, the harness main body 19 includes an outer member 21, one conductive path (FIG. 2) or two conductive paths 22 (FIG. 3) which is or are housed in and protected by the outer member 21, and a linear vibration suppressing member 23 which is a member characterizing the invention. Although the wire harnesses 15 according to the embodiment have one or two conductive paths 22, they are just examples and wire harnesses having three or more conductive paths 22 are possible. A wire harness having plural conductive paths 22 may incorporate a high-voltage conductive path.

In the harness main body 19, portions denoted by reference character C in FIG. 1B are bent routing portions and a portion denoted by reference character D in FIG. 1B is a straight routing portion. That is, the bent routing portions C are portions in regions where the wire harness 15 is wired being bent so as to conform to shapes of attachment (fixing) target portions (wire harness routing target portions) of the vehicle body. The straight routing portion D is the portion between the bent routing portions C (i.e., the portion routed under the vehicle floor 11).

The structures of the outer member 21 and the conductive path(s) 22 of the harness main body 19 will be described first and the structure of the linear vibration suppressing member 23 and the manufacturing method of the wire harness 15 will be described thereafter.

<Outer Member 21>

As shown in FIGS. 2 and 3, the outer member 21 is formed by resin molding as a single, straight (before use) tubular member. (In the invention, the material of the outer member 21 is not limited to a resin; it may be made of a metal.) In the embodiment, the outer member 21 is configured with no divided portion extending along an axis direction thereof; in other words, it has no slit(s). The outer member 21 is circular in cross section.

In the embodiment, the portion, corresponding to the straight routing portion D, of the outer member 21 is a straight tube portion 24 (this is just an example, this portion may be a bellows-shaped portion). Reference numerals 25 and 26 denote an outer surface and an inner surface of the straight tube portion 24, respectively.

In the invention, the linear vibration suppressing member 23 (described later) is inserted in at least the straight tube portion 24 of the outer member 21 together with the conductive path(s) 22.

<Conductive Path 22>

As shown in FIGS. 2 and 3, the conductive path 22 has a conductor 27 and an insulator 28 which is located outside the conductor 27. The conductor 27 is made of copper, a copper alloy, aluminum, or an aluminum alloy and is circular in cross section. The conductor 27 may be formed by twisting element wires together or have a rod structure that is rectangular or circular in cross section (e.g., a rectangular core or circular core conductor; in this case, the harness main body 19 also has a rod structure). The insulator 28 which is made of an insulative resin material is formed on the outer circumferential surface of the conductor 27 by extrusion molding.

The insulator 28 is formed on the outer circumferential surface of the conductor 27 by extrusion molding using a thermoplastic resin material. The thermoplastic resin material is selected as appropriate from various known materials, for example, polymeric materials such as a polyvinyl chloride resin, a polyethylene resin, and a polypropylene resin.

Although the harness main body 19 shown in FIG. 3 have the two conductive paths 22 that are different from each other in thickness, the invention is not limited to that case; the two conductive paths 22 may have the same thickness.

<Linear Vibration Suppressing Member 23>

As shown in FIGS. 2 and 3, the linear vibration suppressing member 23 is a member which decreases the play ratio (i.e., the proportion of the space where the conductive path(s) 22 shakes, or a space inside the outer member 21 where the conductive path(s) 22 is movable) of the conductive path(s) 22 in the inside of a prescribed portion (in the embodiment, corresponding to the straight tube portion 24)

of the outer member 21. As shown in FIGS. 2 and 3, the linear vibration suppressing member 23 is a tube that is linear, elastic, and circular in cross section. Although in the embodiment the linear vibration suppressing member 23 is a rubber tube, it may be a resin tube, a rubber string that is circular or polygonal in cross section, or the like. The linear vibration suppressing member 23 is given a proper size according to the size of the space where the conductive path(s) 22 shakes. The linear vibration suppressing member 23 is inserted in the outer member 21 together with the conductive path(s) 22.

<Manufacturing Method of Wire Harness 15>

To manufacture the wire harness 15 shown in FIG. 1B, the harness main body 19 is manufactured first and then terminal working is done. Referring to FIGS. 2 and 3, the harness main body 19 is manufactured by inserting the conductive path(s) 22 and the linear vibration suppressing member 23 together into the outer member 21 in straight shape from its one opening toward the other opening. It goes without saying that the work of inserting the conductive path(s) 22 and the linear vibration suppressing member 23 into the outer member 21 is facilitated by fixing them to each other in a simplified manner by, for example, winding a tape around them. Although in the embodiment the conductive path(s) 22 and the linear vibration suppressing member 23 are inserted together, it is naturally possible to insert them separately.

When the conductive path(s) 22 and the linear vibration suppressing member 23 have been inserted in the outer member 21, in the straight tube portion 24 the proportion of the space where the conductive path(s) 22 shakes is decreased. That is, the play ratio of the conductive path(s) 22 is decreased.

As described above with reference to FIGS. 1A and 1B to FIG. 3, the wire harness 15 according to the invention includes the tubular outer member 21, the one or two conductive paths 22 which are inserted in and protected by the outer member 21, and the linear vibration suppressing member 23 which is inserted in the outer member 21 together with the conductive path(s) 22.

The linear vibration suppressing member 23 is a member for suppressing shaking of the conductive path(s) 22 by decreasing its play ratio in the inside of at least a prescribed portion of the outer member 21. More specifically, it is preferable that the linear vibration suppressing member 23 be an elastic tube. By incorporating the linear vibration suppressing member 23, shaking of the conductive path(s) 22 relative to the outer member 21 can be suppressed.

Thus, in the wire harness 15 according to the invention, shaking of the conductive path(s) 22 in the outer member 21 can be suppressed. This solves the problem that the insulator 28 of the conductive path(s) 22 hits the inner surface of the outer member 21 strongly and is thereby damaged (where the conductive path(s) 22 has a shield function, a braid or a metal foil can be prevented from being damaged).

It goes without saying that various modifications are possible without departing from the spirit and scope of the invention.

What is claimed is:

1. A wire harness that is routed in a vehicle, the wire harness comprising:
an outer member having a tubular shape;
at least one conductive path configured to be contained in the outer member and protected by the outer member; and
a single linear vibration suppressing member configured to suppress shaking of the at least one conductive path during operation of the vehicle by decreasing a play ratio of the at least one conductive path in an inside of at least a prescribed portion of the outer member,
wherein the single linear vibration suppressing member is contained in the outer member, extends along the at least one conductive path in an axial direction of the outer member, and is non-coaxial with the outer member, is formed of a hollow tube, and maintains a substantially circular cross section during operation of the vehicle to suppress shaking of the at least one conductive path during operation of the vehicle; and
wherein the at least one conductive path is non-coaxial with the outer member,
the at least one conductive path is non-coaxial with the single linear vibration suppressing member,
an outer surface of the at least one conductive path contacts an outer surface of the single linear vibration suppressing member, and
the at least one conductive path and the outer member are not electrically connected.

2. The wire harness according to claim 1, wherein the single linear vibration suppressing member is an elastic tube.

3. The wire harness according to claim 2, wherein the elastic tube is linear and circular in cross section.

4. The wire harness according to claim 1, wherein the prescribed portion of the outer member corresponds to a portion where the wire harness is routed straightly.

5. The wire harness according to claim 1, wherein the single linear vibration suppressing member is configured to be a proper size based on a size of the inside of the outer member.

6. The wire harness according to claim 1, wherein the at least one conductive path includes a plurality of conductive paths; and
wherein the single linear vibration suppressing member contacts an inner surface of the outer member and outer surfaces of the plurality of conductive paths.

7. The wire harness according to claim 6, wherein each of the plurality of conductive paths contacts an outer surface of at least one of the other conductive paths, the inner surface of the outer member, and the outer surface of the single linear vibration suppressing member.

8. The wire harness according to claim 1, wherein the at least one conductive path constitutes a single conductive path, and
wherein a combined diameter of the single linear vibration suppressing member and the single conductive path is substantially equal to an inner diameter of the outer member.

9. A wire harness that is routed in a vehicle, the wire harness comprising:
an outer member having a tubular shape;
a conductive path configured to be contained in the outer member and protected by the outer member; and
a single linear vibration suppressing member configured to suppress shaking of the at least one conductive path during operation of the vehicle by decreasing a play ratio of the at least one conductive path in an inside of at least a prescribed portion of the outer member,
wherein the single linear vibration suppressing member is contained in the outer member, extends along the at least one conductive path in an axial direction of the outer member, and is non-coaxial with the outer member, is formed of a hollow tube, and maintains a substantially circular cross section during operation of the vehicle to suppress shaking of the at least one conductive path during operation of the vehicle.

\* \* \* \* \*